(12) United States Patent
Nakamura et al.

(10) Patent No.: US 6,206,487 B1
(45) Date of Patent: Mar. 27, 2001

(54) BRAKE PRESSURE CONTROL DEVICE

(75) Inventors: Hirotaka Nakamura, Saitama; Atsushi Nishijo, Tokyo, both of (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/144,849

(22) Filed: Sep. 1, 1998

(30) Foreign Application Priority Data

Sep. 2, 1997 (JP) .................................................... 9-236804
Nov. 21, 1997 (JP) .................................................... 9-320987

(51) Int. Cl.$^7$ ...................................................... B60T 8/34
(52) U.S. Cl. ................ 303/118.1; 303/DIG. 12; 303/127; 137/102; 137/512.2
(58) Field of Search ................ 303/127, 29, 30, 303/40, 54, 80, 1, 82, DIG. 12, 118.1; 137/102, 512.2

(56) References Cited

U.S. PATENT DOCUMENTS

| | | | |
|---|---|---|---|
| 3,602,554 | * | 8/1971 | Yokohama .................. 303/21 AF |
| 3,972,341 | * | 8/1976 | Wheless ....................... 137/102 |
| 3,977,734 | * | 8/1976 | Ronnhult et al. ............ 303/21 F |
| 4,155,603 | * | 5/1979 | Harries ......................... 303/110 |
| 5,118,169 | * | 6/1992 | Moller ........................... 303/118 |
| 5,340,212 | * | 8/1994 | Latvala ............................. 303/7 |
| 5,443,306 | * | 8/1995 | Broome ............................ 303/3 |

FOREIGN PATENT DOCUMENTS

| | | | |
|---|---|---|---|
| 57-018545 | * | 1/1982 | (JP) . |
| 02102862 | * | 4/1990 | (JP) . |
| 2-256555 | | 10/1990 | (JP) . |
| 05024531 | * | 2/1993 | (JP) . |
| 8-58546 | | 3/1996 | (JP) . |

* cited by examiner

Primary Examiner—Robert J. Oberleitner
Assistant Examiner—Bradley King
(74) Attorney, Agent, or Firm—Morgan, Lewis & Bockius LLP (57) ABSTRACT

A brake pressure control device is provided that includes a brake valve, an air master cylinder, and an air control valve. The air control valve is provided between the brake valve and the air master cylinder for selectively controlling the air pressure supplied from the brake valve to the air master cylinder. The air control valve includes an input port coupled to the brake valve for receiving air pressure provided from the brake valve; an exhaust port coupled to open air and to a back pressure chamber of the air master cylinder; an output port coupled to the air master cylinder; a pipe passageway coupled between the input port, the exhaust port, and the output port; at least one diaphragm provided within the pipe passageway; and a release valve connected between the exhaust port and the output port for releasing air pressure from the output port to the exhaust port during a brake releasing operation.

2 Claims, 8 Drawing Sheets

BRAKE PRESSURE CONTROL DEVICE

This application claims the benefit of Japanese Patent Application No. Hei. 9-236804, filed Sep. 2, 1997, and Japanese Application No. Hei. 9-320987, filed Nov. 21, 1997, which are hereby incorporated by reference.

BACKGROUND OF THE INVENTION

1. Field of the Invention

The present invention relates to a braking systems, and more particularly to a brake pressure control device which is able to control a brake pressure by means of an air control valve for anti-lock control.

2. Discussion of the Related Art

Conventionally within the field of braking systems, brake pressure control devices that execute a braking operation by means of air pressure are known. Examples of which are disclosed, for example, in Japanese Patent Publications Nos. 2-256555 of Heisei and 8-58546 of Heisei.

The brake pressure control device disclosed in the above-mentioned Japanese Patent Publication No. 2-256555 of Heisei is an anti-lock brake device which includes a modulator valve connected between a brake valve and a brake device for converting the low pressure of compressed air pressure fed from the brake valve to a high oil pressure necessary to brake a wheel by use of such oil pressure. The modulator valve is utilized to selectively bring the compressed air provided from the brake valve into communication with the brake device or selectively reduce the pressure of the thus communicated compressed air, and such selective communication and selective pressure reduction within the modulator valve is achieved by way of a port formed in a pipe passage communicating between the brake valve to the brake device. A valve energized toward the port by a spring is provided, and the valve is allowed to selectively open or close the port. The modulator valve also includes a check valve which is arranged in the pipe passage to prevent the air pressure from flowing into the pipe passage portions in the front of and in the rear of the above-mentioned energized valve from the upstream side to the downstream side.

Due to this structure, this anti-lock brake pressure control device is able to relieve or eliminate brake dragging after a brake pedal returns to its resting position after being activated.

However, when this anti-lock brake device is switched from its brake operation condition to its brake release condition, the air pressure on the air master cylinder side is directed through hold diaphragms within an air control valve and then through the air control valve itself. The air pressure is then directed through a long pipe passage connecting or communicating the air control valve to the brake valve, and is finally discharged to the open air through an exhaust port formed in the brake valve. Thus, the passage for releasing the air pressure in the brake opening operation is long, which, together with fluid frictional resistance and the like produced within the pipe passage, makes it difficult to reduce the air pressure of the air master cylinder (to release the brake) quickly.

In other words, since the pipe passage for releasing the air pressure in the brake releasing operation is so long, any improvement in the response performance of the brake device is extremely limited.

Moreover, in this conventional brake device, when the air master cylinder is in operation, the open air must be introduced into or discharged from a piston back pressure chamber formed within the air master cylinder and, as a result, the use of an air breather is required. This air breather must be structured such that it has an environmental resistance in order to prevent water or dust from flowing towards the piston back pressure chamber. This increases the cost of the air breather. Also, the breather installation requirement increases the number of man-hours required to assemble the braking system, thus increasing the production costs and operation complexity of the braking system.

On the other hand, the brake pressure control device disclosed in the above-mentioned Japanese Patent Publication No. 8-58546 of Heisei comprises a brake control valve which is interposed between a compressed air source for generating a braking operation pressure using compressed air and a brake actuator. The braking operation pressure is supplied for generating a brake pressure for braking a wheel and to control the supply and discharge of the brake operation pressure with respect to the brake actuator. A modulator including an electromagnetic valve is interposed between the brake control valve and the brake actuator. This modulator controls the brake operation pressure to be supplied to the brake actuator.

In the brake pressure control devise, the modulator includes a pressure holding diaphragm for holding the brake pressure in an anti-lock control operation, and a pressure discharging diaphragm for discharging the brake pressure, whereby, as the need arises during its anti-skid brake control operation, the diaphragms can be opened and closed to thereby be able to prevent the brake from being locked.

However, in the above-structured brake pressure control device, the modulator (also known as an air control valve) must always require two diaphragms for holding and decaying or discharging the pressure, which, together with a passage for allowing the two diaphragms to communicate with each other, makes the whole structure of the modulator relatively complex. Moreover, the use of the two diaphragms increases the component count of the braking system. That is, there is a need in the art of brake pressure control devices to be able to reduce the size, complexity, and weight of these devices.

In particular, as the number of passages formed within an air control valve housing increases, the number of seal surfaces increases accordingly, which both makes the housing larger in size as well as increases the time necessary for assembling the housing. Moreover, as the number of diaphragms increases, the complexity of the system increases and the time necessary to assemble the diaphragms to the housing also increases.

SUMMARY OF THE INVENTION

Accordingly, the present invention is directed to a brake pressure control device that aims at eliminating the above-mentioned drawbacks found in the conventional brake pressure control devices and that substantially obviates one or more of the problems due to the limitations and disadvantages of the related art.

Accordingly, one object of the present invention is the provision of a brake pressure control device having an improved pressure reducing performance.

Another object of the present invention is the provision of a brake pressure control device with a simplified air control valve section having a shortened air pressure exhaust passage as well as a reduction in the number of necessary components in the overall brake pressure control device.

Another object of the present invention is to reduce the number of diaphragms provided within the air control valve to only one and to utilize a small-sized decay valve of a two-way/two-port type to simplify an air pressure flow passage, thereby being able to reduce the number of seal surfaces, shorten the operational time frame, and reduce the size and weight of the main body of the air control valve.

Additional features and advantages of the present invention will be set forth in the description which follows, and in part will be apparent from the description, or may be learned by practice of the invention. The objectives and other advantages of the invention will be realized and attained by the structure particularly pointed out in the written description and claims hereof as well as in the appended drawings.

To achieve these and other advantages and in accordance with the purpose of the present invention, as embodied and broadly described, the brake pressure control device includes a brake valve; an air master cylinder for braking a wheel by an air pressure that is provided from the brake valve; and an air control valve, coupled between the brake valve and the air master cylinder, for selectively providing the air pressure from the brake valve into communication with the air master cylinder and selectively reducing a pressure level of the air pressure from the brake valve. The air control valve includes an input port coupled to the brake valve for receiving the air pressure that is provided from the brake valve; an exhaust port coupled to open air and to a back pressure chamber of the air master cylinder; an output port coupled to the air master cylinder; a pipe passageway coupled between the input port, exhaust port, and output port; at least one diaphragm provided within the pipe passageway; and a release valve which is connected between the exhaust port and the output port for releasing air pressure from the output port to the exhaust port during a brake releasing operation.

In another aspect, an air control valve for use within a brake pressure control device to selectively provide air pressure to an air master cylinder and selectively reduce a pressure level of the air pressure is provided. The air control valve includes an input port for receiving the air pressure from an air supply; an exhaust port coupled to open air and to the air master cylinder; an output port coupled to the air master cylinder; a pipe passageway coupled between the input port, the exhaust port and the output port, at least one diaphragm provided within the pipe passageway; and a release valve which is connected between the exhaust port and the output port for releasing air pressure from the output port to the exhaust port during a brake releasing operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
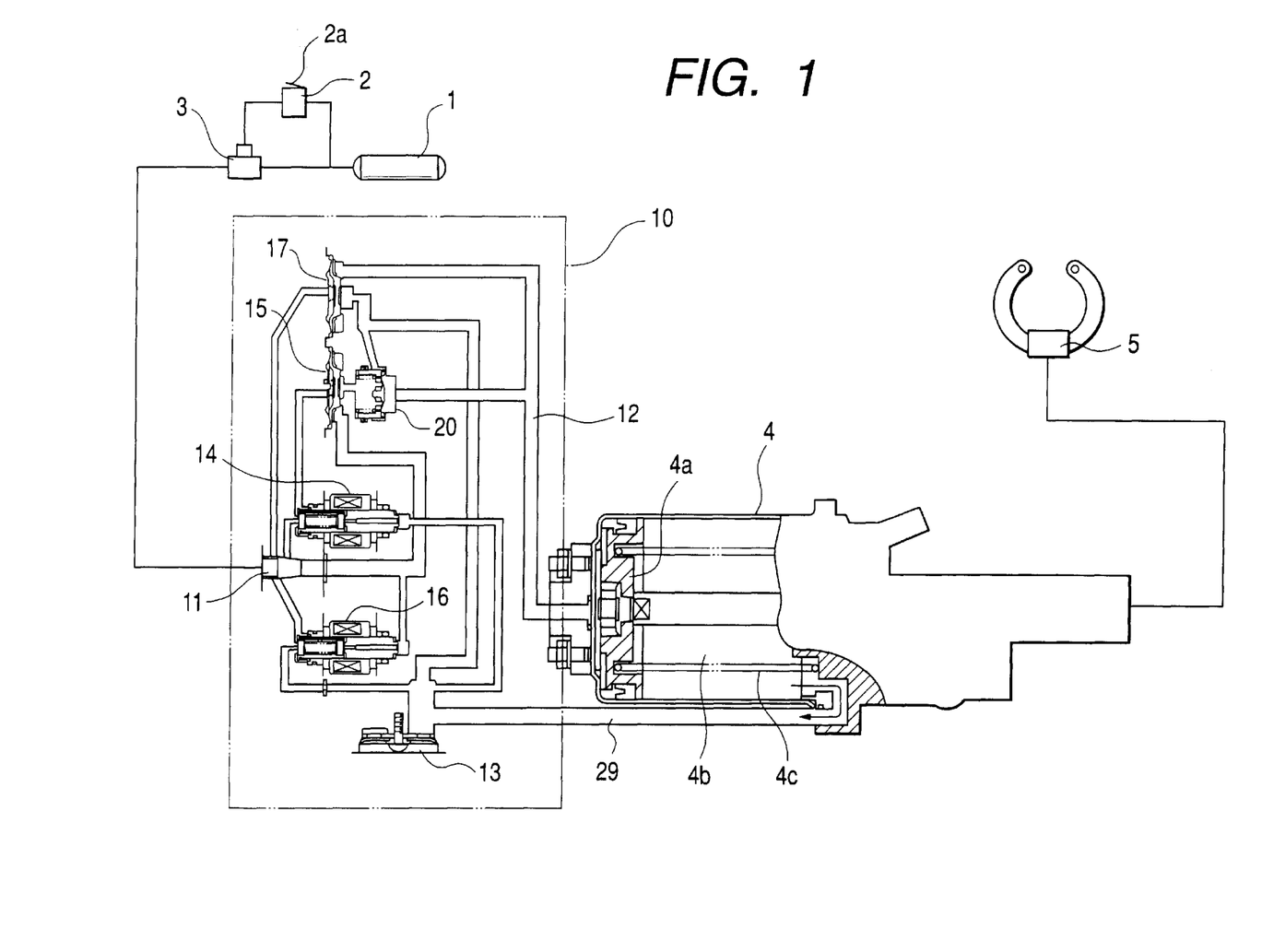
FIG. 1 is a schematic structural view of a brake pressure control device according to a first embodiment of the invention.
Figure 2:
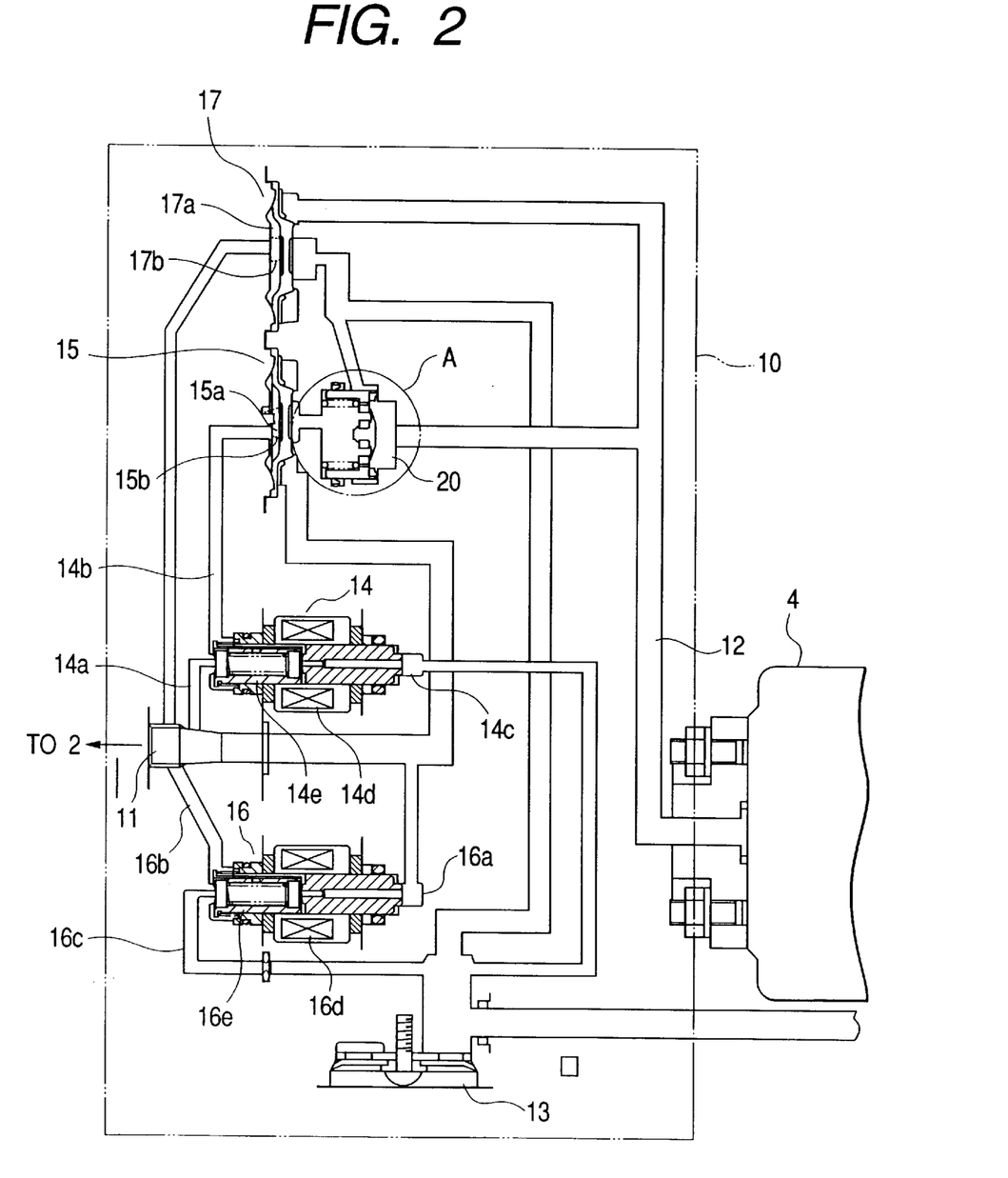
FIG. 2 is a structural view of an air control valve used in the brake pressure control device of FIG. 1.

FIG. 1 is a schematic structural view of a brake pressure control device according to a first embodiment of the invention, and FIG. 2 is a structural view of a flow passage employed in an air control valve used in the above brake pressure control device.

The device of FIG. 1 illustrates an air tank 1, a brake valve 2, break pedal 2*a*, a relay valve 3, an air control valve 10, an air master cylinder 4, and a brake cylinder 5.

When the brake pedal 2*a* is depressed, the brake valve 2 is opened and an amount of air corresponding to the stepping force of the brake pedal 2*a* is supplied from the air tank 1 to the air control valve 10 due to the operation of the relay valve 3. The air output from the air control valve 10 is applied to the air master cylinder 4, where the air pressure is converted to an oil pressure for actuating the brake cylinder 5 to thereby be able to apply the brakes.

It is possible to provide another type of brake pressure control device in which the air master cylinder 4 is omitted and the air pressure is supplied directly to the brake cylinder 5 for applying the brakes.

The air control valve 10, as shown in FIG. 2, employs a flow passage which includes an input port 11 that is in communication with the brake valve 2, an output port 12 that is in communication with the air master cylinder 4 side, and an exhaust port 13 for releasing the air pressure to the open air. In the present flow passage, in such a manner as shown in FIG. 2, there are disposed a hold valve 14, a hold diaphragm 15, a decay valve 16, a decay diaphragm 17, and a release valve 20 having a unique structure (which will be further discussed) between the output port 12 side passage of the hold diaphragm 15 and the exhaust port 13 side passage of the decay diaphragm 17. In FIG. 2, a flow passage indicated by the thicker lines is a main flow passage which is used when applying the brakes, whereas the flow passage indicated by narrower lines is a flow passage which is located on the back pressure side of the device and is used when controlling the respective valves.

The input port 11 communicates, through the hold diaphragm 15 located in the main flow passage, with the output port 12 which is in communication with the air master cylinder 4, whereas the output port 12 communicates with the exhaust port 13 through the decay diaphragm 17 located in the main flow passage. The hold diaphragm 15 has a function to bring the input port 11 and the output port 12 into communication with each other as well as cut off their mutual communication. Also, the decay diaphragm 17 has a function to bring the output port 12 and exhaust port 13 into communication with each other as well as cut off their mutual communication.

Figure 3:
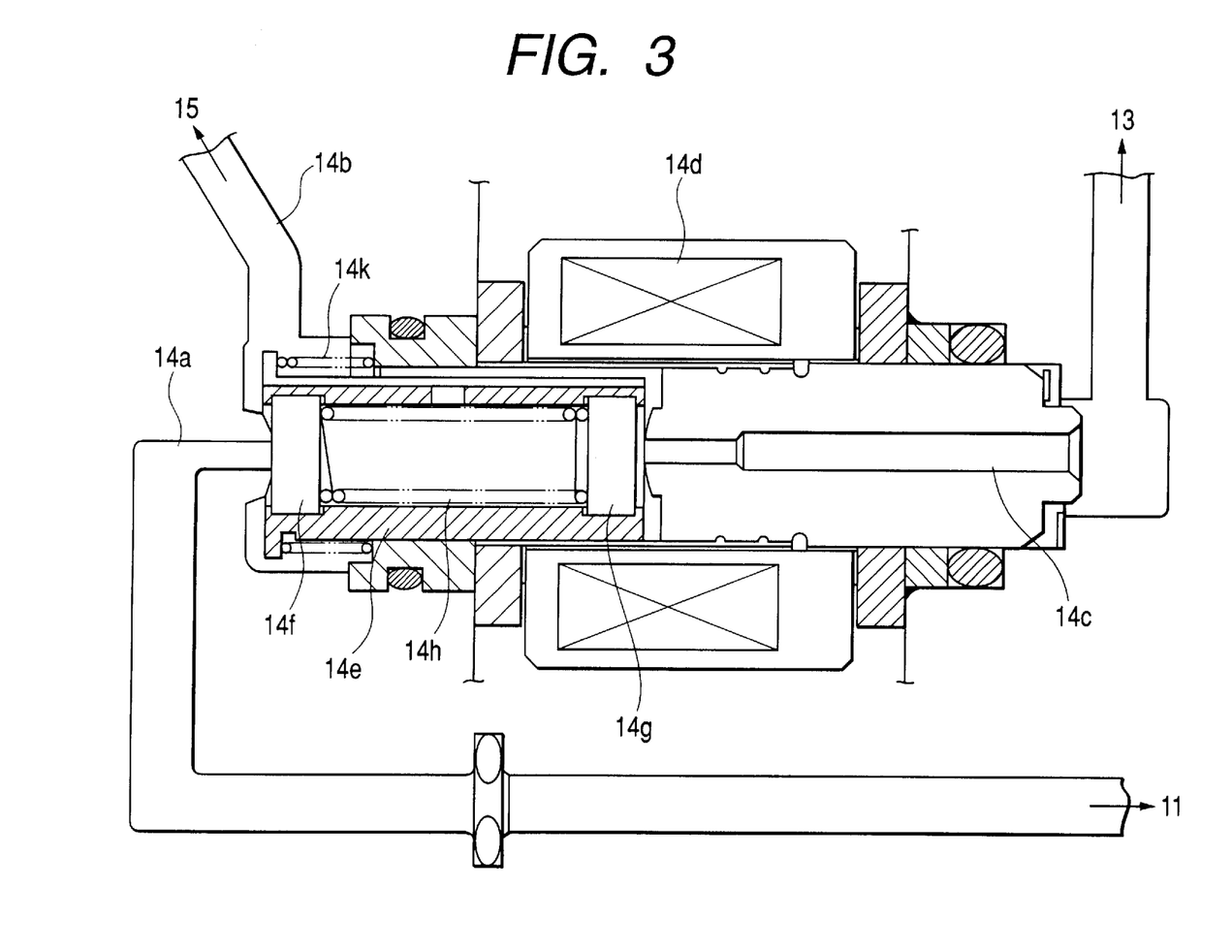
FIG. 3 is an enlarged sectional view of a hold valve disposed within the air control valve of FIG. 2.

The hold valve 14 has a structure which is shown in FIG. 3 in an enlarged manner. In particular, the hold valve 14 includes a valve input port 14a, a valve output port 14b and a valve exhaust port 14c; and, within the hold valve 14, there is disposed a plunger 14e which is used to bring the respective ports into communication with each other and cut off their mutual communication. The plunger 14e includes two flow passage cutoff members 14f and 14g in the two end portions thereof. Also, between the two flow passage cutoff members 14f and 14g of the plunger 14e, there is interposed a spring 14h and, due to the energizing force of the spring 14h, the two flow passage cutoff members 14f and 14g are able to close the flow passages, that is, the valve input and output ports 14a and 14b in an elastic manner. The plunger 14e is normally energized toward the left in FIG. 3 by a return spring 14k and, if a solenoid 14d is energized, then the plunger 14e can be moved to the right from its shown normal position.

The valve input port 14a of the hold valve 14 is in communication with the input port 11 side, the valve output port 14b thereof is in communication with a back pressure chamber 15a formed in the hold diaphragm 15, and the valve exhaust port 14c is in communication with the exhaust port 13 on the main flow passage side. When not in operation, the valve input port 14a is cut off from the valve output port 14b, whereas the valve output port 14b is in communication with the valve exhaust port 14c. On the other hand, if the solenoid 14d of the hold valve 14 is energized and the plunger 14e is thereby moved right in FIG. 3 into its operation position, then the valve input port 14a and valve output port 14b are brought into mutual communication with each other, whereas the valve output port 14b is cut off from communication with the valve exhaust port 14c.

The hold diaphragm 15 is formed of an elastic member and, normally, it is energized in a direction to cut off the mutual communication between the input and output ports 11 and 12 by a return spring 15b which is disposed on the back pressure chamber 15a side.

The decay valve 16 has a similar structure to the above-mentioned hold valve 14. In particular, as shown in FIG. 2, the decay valve 16 includes a valve exhaust port 16c which corresponds to the valve input port 14a of the hold valve 14, and a valve input port 16a corresponding to the valve exhaust port 14c of the hold valve 14. By the way, the remaining portions of the structure of the decay valve 16 are the same as the hold valve 14.

The decay valve 16 includes a valve input port 16a on the input port 11 side thereof in communication with the brake valve 2, a valve output port 16b in communication with a back pressure chamber 17a formed in the decay diaphragm 17, and a valve exhaust port 16c in communication with the exhaust port 13 on the main flow passage side. When not in operation, the valve input port 16a and valve output port 16b are in communication with each other, whereas the valve output port 16b and valve exhaust port 16c are cut off from each other. If the solenoid 16d of the decay valve 16 is energized and a plunger 16e is thereby moved to the right in FIG. 2 into its operation position, then the valve input port 16a and valve output port 16b are cut off from their mutual communication, whereas the valve output port 16b is brought into communication with the valve exhaust port 16c.

The decay diaphragm 17 is formed of an elastic member and, normally, it is energized in a direction to cut off the mutual communication between the output and exhaust ports 12 and 13 by a return spring 17b which is disposed on the back pressure chamber 17a side.

Between the passage on the output port 12 side of the hold diaphragm 15 and the passage on the exhaust port 13 side of the decay diaphragm 17, is disposed a release valve 20. If a difference between the air pressures applied onto the release valve 20 reaches a given value or more, then the air pressure on the output port 12 side is allowed to flow to the exhaust port 13 side of the decay diaphragm 17 through the release valve 20.

A description will now be given to provide more detail of the structure of the release valve 20 with reference to FIG. 4. The release valve 20 includes a piston 22 within a cylinder 21 in such a manner that the piston 22 can be freely slided, the release valve 20 is divided by the piston 22 into a hold diaphragm 15 side and an output port 12 side, and, in the cylinder 21, there is formed a flow passage 28 which communicates with the exhaust port 13 side. The flow passage 28 is normally cut off from the output port 12 side of the release valve 20 by the piston 22. The piston 22 is energized toward the right in FIG. 4 by the energizing force of a return spring 23. Also, in the piston 22, there are formed a large number of flow passages 24, and a rubber sheet 25 for closing the flow passages is mounted on the piston 22. The rubber sheet 25 is structured such that, if the air pressure on the hold diaphragm 15 side becomes higher than the air pressure on the output port 12 side by a given value or more (that is, if the air pressure rises up to such a level that is sufficient to deform the rubber sheet 25), then the rubber sheet 25 is so deformed to thereby be able to supply the air pressure from the hold diaphragm 15 side to the output port 12 side through the flow passages 24. On the other hand, if the air pressure on the output port 12 side becomes higher than the air pressure on the hold diaphragm 15 side by a given value or more, then the piston 25 is moved toward the left in FIG. 4 against the energizing force of the spring 23 to thereby be able to discharge the air pressure on the output port 12 side from the exhaust port 13 through the flow passage 28.

Figure 4:
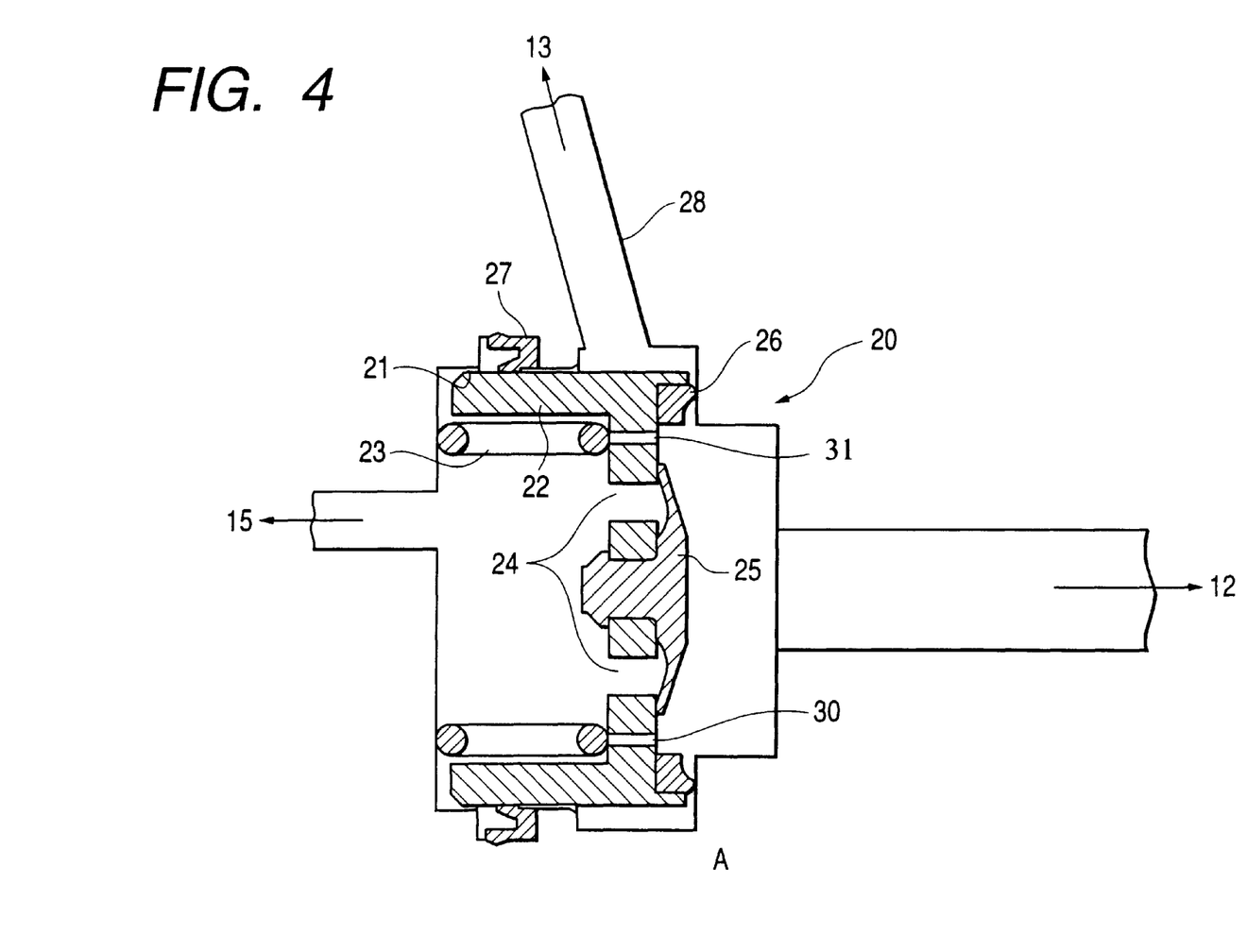
FIG. 4 is an enlarged sectional view of a release valve disposed within the air control valve of FIG. 2.

Reference numeral 26 in FIG. 4 designates a seal member which is provided on the end face of the piston, and reference numeral 27 designates a seal member which is interposed between the periphery of the piston 22 and the inner peripheral surface of the cylinder 21.

The above-mentioned exhaust port 13, as shown in FIG. 1, communicates through a pipe 29 with a back pressure chamber 4b formed in a piston 4a which is provided within the air master cylinder 4, while the back pressure chamber 4b is normally maintained at the atmospheric pressure through the exhaust port 13. The present air master cylinder 4 is similar in structure to a conventional air master cylinder in that if the air pressure from the output port 12 acts on the piston 4a within the air master cylinder 4, then the piston 4a is moved to the right in FIG. 1 to convert the air pressure into an oil pressure, thereby being able to actuate the brake cylinder and thus apply the brakes. In FIG. 1, reference numeral 4c designates a return spring. The present invention also contemplates that instead of converting the air pressure into the oil pressure, the air pressure can also be supplied directly to the brake cylinder so that the air pressure it utilized to directly brake the wheel.

A description will now be given of the operation of the brake pressure control device having the above-mentioned structure. If the brake pedal 2a is depressed, then the brake valve 2 is opened so that, due to the operation of the relay valve 3, the air corresponding to the stepping force of the brake pedal 2a is supplied from the air tank 1 to the air control valve 10. The air pressure, which flows into the air control valve 10 through the input port 11, acts on the hold diaphragm 15 to move the same to the left in FIGS. 1 and 2 against the energizing force of the return spring 15b to thereby open the flow passage, and thus the air pressure flows into the release valve 20. Upon flowing into the release valve 20, the air pressure deforms the rubber sheet 25 through the flow passages 24 formed in the piston 22 of the release valve 20, so that the air pressure is supplied from the hold diaphragm 15 side to the output port 12 side to thereby operate the air master cylinder 4. As a result of this, in a similar way as in the conventional brake pressure control device, the brake cylinder 5 can be actuated to thereby apply the brake.

In this operation, although the air pressure acts on the decay diaphragm 17 as well from the output port 12 side, the air pressure on the input port 11 side acts on the back pressure chamber 17a of the decay diaphragm 17 by passing first through the valve input port 16a and secondly passing through the valve output port 16b of the decay valve 16 in this order. As a result of this structural arrangement within the air control valve, the possibility that the decay diaphragm 17 can be opened by the air pressure on the brake device side is eliminated.

When the brake pedal 2a is released, the hold diaphragm 15 is opened due to the air pressure in the pipe interposed between the release valve 20 and hold diaphragm 15 because the back pressure chamber 15a of the hold diaphragm 15 is maintained at the atmospheric pressure through the exhaust port 13, so that the air pressure in the pipe is released into the open air through the input port 11. In response to this, within the release valve 20, the air pressure on the output port 12 side acting on the piston 22 moves the piston 22 to the left in FIG. 4 against the energizing force of the spring 23, so that the output port 12 and exhaust port 13 are brought into mutual communication with each other. As a result of this, the air pressure on the side of the output port 12 in communication with the air master cylinder 4 is discharged to the open air through the exhaust port 13, thereby releasing the brake. Moreover, because the back pressure chamber 17a of the decay diaphragm 17 is also brought into communication with the input port 11 through the valve output port 16b and valve input port 16a of the decay valve 16 in this order and is thus turned into the atmospheric pressure, the decay diaphragm 17 is opened by the air pressure on the output port 12 side acting on the decay diaphragm 17. Thus, the particular structure within the air control valve of the instant invention allows part of the air pressure on the output port 12 side to be discharged through the decay diaphragm 17 from the exhaust port 13 as well.

Moreover, part of the air pressure discharged to the exhaust port 13 side flows into the back pressure chamber 4b side through the pipe 29 which communicates the exhaust port 13 and the back pressure chamber 4b of the air master cylinder 4 to each other, and acts on the piston 4a of the air master cylinder 4 to thereby return it to the initial position thereof. In this manner, according to the present embodiment, not only the exhaust passage in the brake releasing operation can be shortened but also the air pressure on the exhaust port side can assist the piston of the air master cylinder in returning to its initial position, thereby being able to improve the pressure reducing performance of the brake cylinder.

During the brake releasing operation, if the piston 22 is fixed and thus cannot be moved, then the air pressure pushes up the hold diaphragm 15 through orifices 31 and 30, so that the air pressure can be released from the brake valve 2.

While the braking operation taking place, if the anti-lock control is initiated and a brake pressure hold instruction is issued, then the solenoid 14d of the hold valve 14 is energized to actuate the plunger 14e to thereby bring the valve input port 14a and valve output port 14b of the hold valve 14 into mutual communication with each other, so that the air pressure supplied from the air tank is applied onto the back pressure chamber 15a of the hold diaphragm 15 to thereby cut off the communication between the input and output ports 11 and 12 and, therefore, the air pressure on the air master cylinder side can be held at the then air pressure.

If a brake pressure reducing instruction is issued, then the solenoid 16d of the decay valve 16 is energized to actuate the plunger 16e to thereby bring the valve output port 16b and valve exhaust port 16c of the decay valve 16 into mutual communication with each other, so that, while the air pressure is still being applied to the back pressure chamber 15a of the hold diaphragm 15, the air pressure on the back pressure chamber 17a side of the decay diaphragm 17 is released. As a result of this, the air pressure on the brake device side is discharged from the exhaust port 13 through the decay diaphragm 17, thereby reducing the brake pressure.

If a brake pressure re-apply instruction is issued, then the hold valve 14 and decay valve 16 are both switched off and, therefore, the air pressure on the input port 11 side opens the hold diaphragm 15 and thus it is supplied to the output port 12 side, thereby being able to apply the brake pressure again.

As described above, according to the present embodiment, during the brake releasing operation, the air pressure on the air master cylinder is discharged to the exhaust port side through the release valve, and also part of the air pressure on the exhaust port side is applied to the back pressure side of the air master cylinder. As a result of these two features, the exhaust passage is shortened and the return of the piston within the air master cylinder to its initial position is quickened, thereby being able to improve the brake reducing performance of the brake pressure control device.

While the above-described embodiment teaches that the release valve is disposed within the air control valve, the invention also contemplates that the release valve can be disposed at another functional position between the exhaust port 13 side passage and output port 12 side passage.

Figure 5:
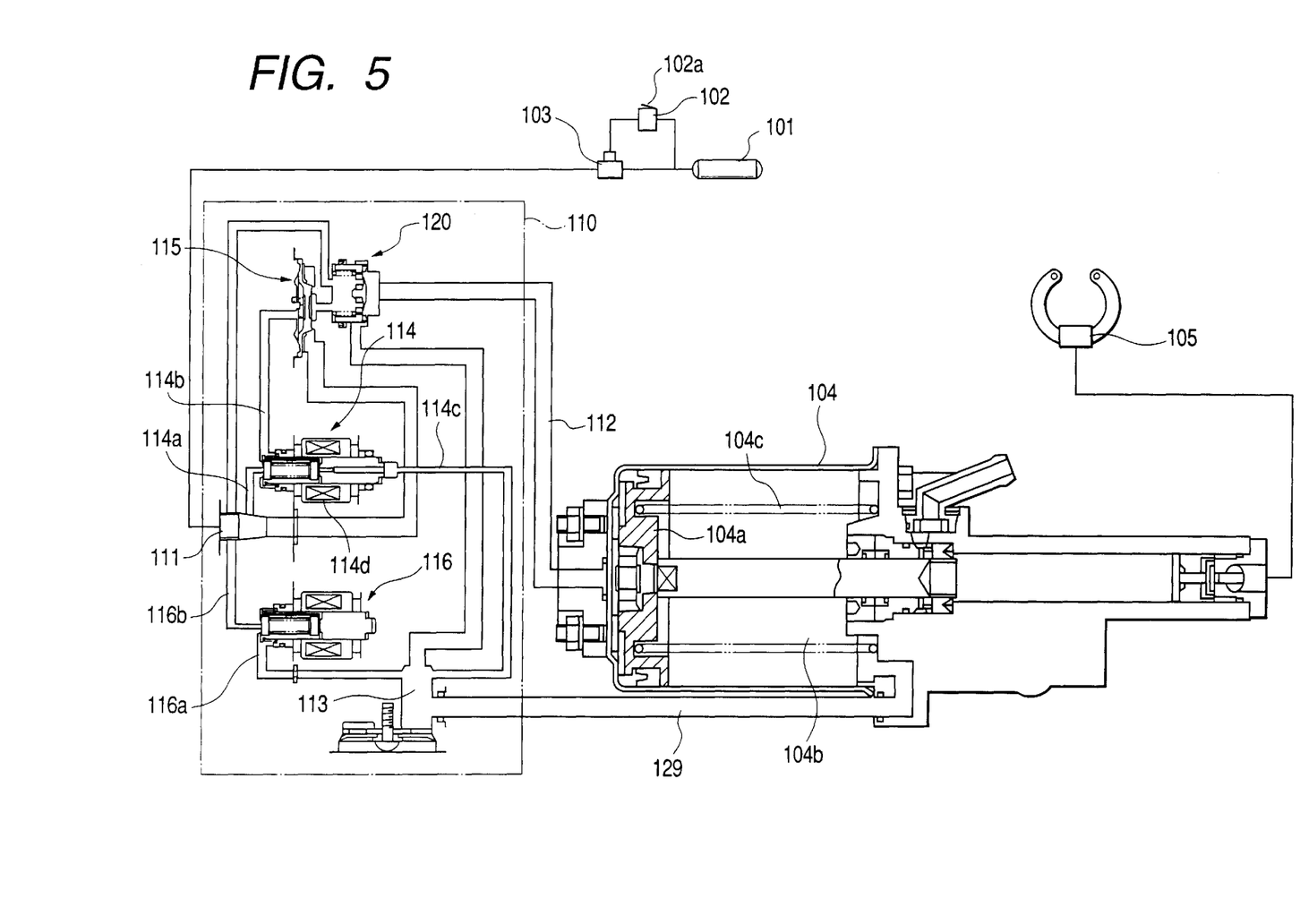
FIG. 5 is a schematic structural view of a brake pressure control device according to a second embodiment of the invention.
Figure 6:
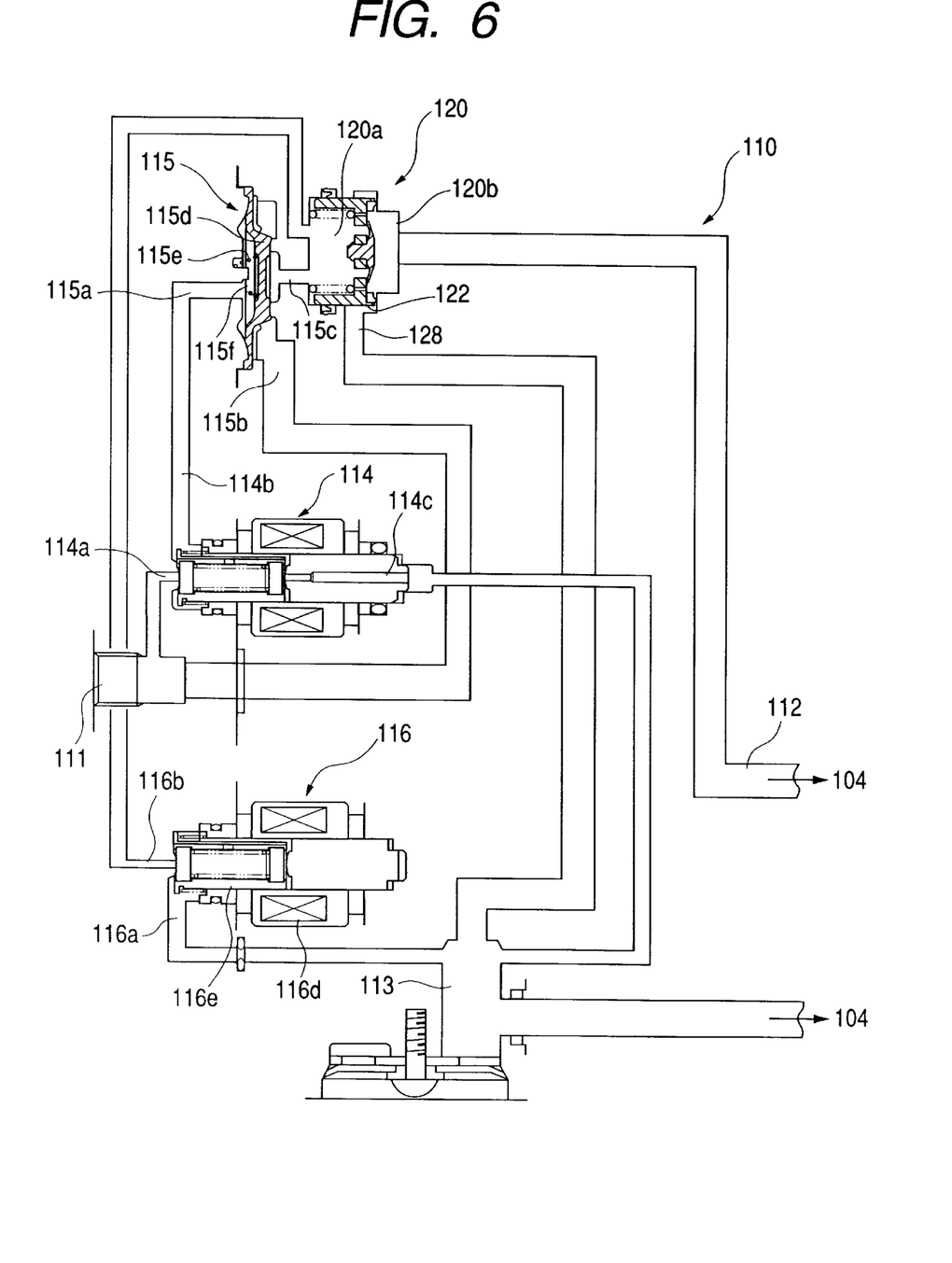
FIG. 6 is a structural view of a flow passage formed within an air control valve in the brake pressure control device of FIG. 5.

FIG. 5 is a schematic structural view of a brake pressure control device according to a second embodiment of the invention. FIG. 6 is a structural view of a flow passage employed in an air control valve used in the brake pressure control device of FIG. 5.

The brake pressure control device arrangement shown in FIG. 5 includes an air tank 101, a brake valve 102, a brake pedal 102a, a relay valve 103, an air control valve 110 according to the second embodiment, an air master cylinder 104, and a brake cylinder 105.

According to the present brake pressure control device of this second embodiment, if the brake pedal 102a is depressed, then the brake valve 102 is opened and an air amount corresponding to the stepping force of the brake pedal 102a is supplied from the air tank 101 to the air control valve 110 due to the operation of the relay valve 103, and the air output from the air control valve 110 is applied to the air master cylinder 104 where the air pressure is converted to an oil pressure to thereby be able to actuate the brake cylinder 5, so that the brakes can be applied. Another arrangement is also contemplated in which the air master cylinder 104 is omitted and the air pressure thus supplied directly to the brake cylinder 105.

A description will now be given of the above-mentioned respective components of the second embodiment with reference to the accompanying drawwings. The air control valve 110, as shown in FIG. 6, employs a flow passage which includes an input port 111 communicating with the relay valve 103, an output port 112 communicating with the air master cylinder 104 side, and an exhaust port 113 for releasing the air pressure to the open air. In the present flow passage, in such a manner as shown in FIG. 6, there are disposed a hold valve 114, a hold diaphragm 115, a decay valve 116, and a release valve 120. The release valve 120 is disposed in communication with the output port 115c side passage of the hold diaphragm 115. The structure of the release valve 120 will be further discussed below.

In FIG. 6, a flow passage indicated by the thicker of the two flow passage paths is a main flow passage which is used when applying the brakes, whereas the flow passage indicated by the narrower of the two flow passage paths is a flow passage which is located on the back pressure side and is used when controlling the respective valves.

The input port 111 communicates through the hold diaphragm 115 located in the main flow passage, the output port 115c of the hold diaphragm 115 and the release valve 120, with the output port 112 in communication with the air master cylinder 104. The release valve 120, as shown in FIG. 6, communicates through a flow passage 128 with the exhaust port 113; and, the first division chamber 120a of the release valve 120 communicates with the second port 116b of the decay valve 116.

The detailed structures of the hold diaphragm 115, release valve 120, hold valve 114 and decay valve 116 of the second embodiment of the instant invention will be described below with reference to the accompanying drawings.

Figure 7:
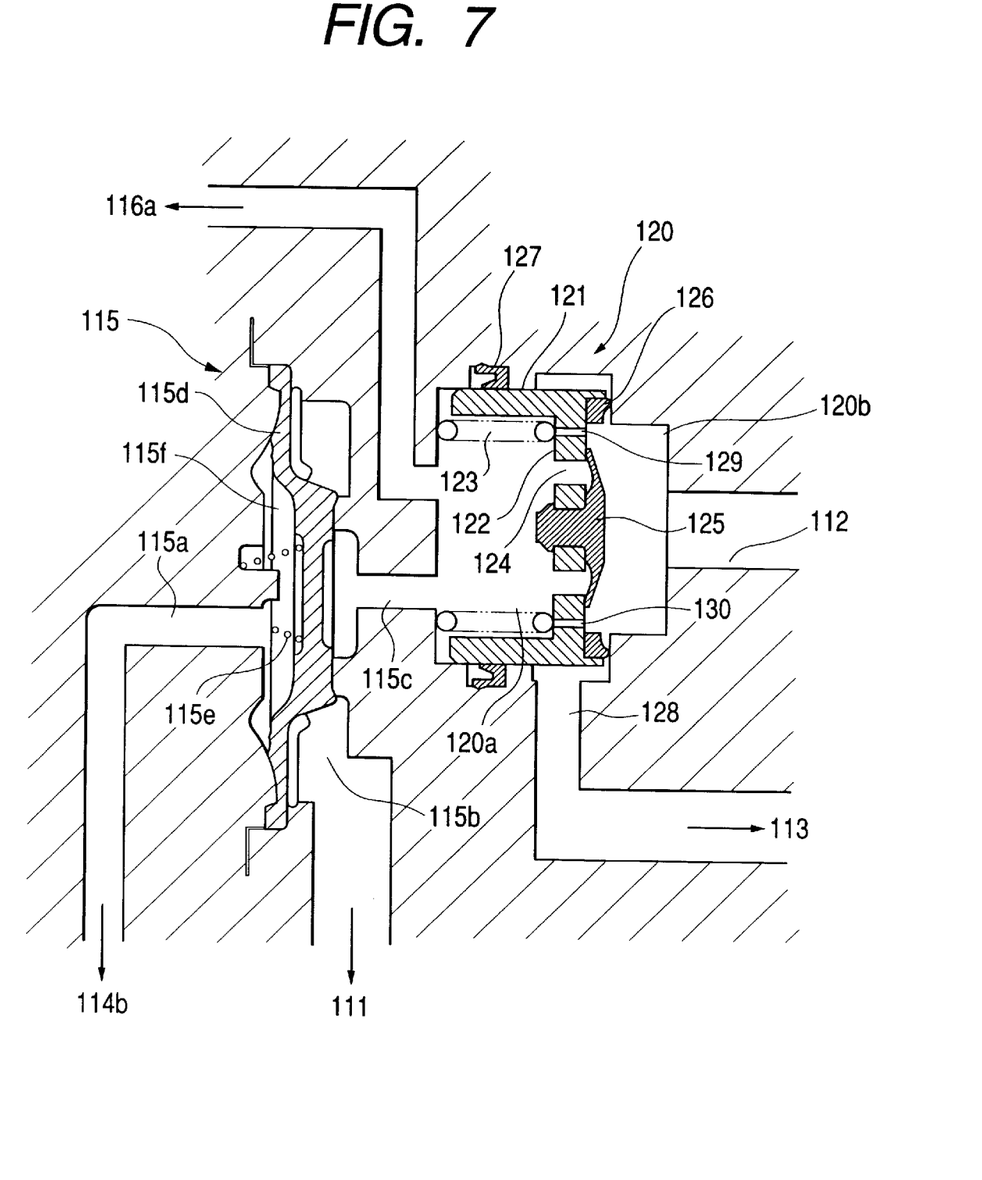
FIG. 7 is an enlarged sectional view of a hold diaphragm and a release valve respectively disposed within the air control valve of FIG. 6.

In FIG. 7, the hold diaphragm 115 includes a diaphragm 115d formed of an elastic member, a first hold port 115a which is in communication with the back pressure chamber 115f of the hold diaphragm 115 and with the second hold port 114b of the hold valve 114, to be discussed later, a second hold port 115b in communication with the input port 111, a third hold port 115c in communication with the first division chamber 120a of the release valve 120, and a return spring 115e which is disposed on the back pressure chamber 115f side of the hold diaphragm 115. The hold diaphragm 115 operates in the following fashion. The elastic member diaphragm 115d is energized toward the right in FIG. 7 by the return spring 115e so that the second hold port 115b and third hold port 115c are cut off from each other. If the air pressure on the second hold port 115b side reaches a particular minimum value or higher, then the diaphragm 115d is moved to the left in FIG. 7 against the energizing force of the return spring 115e to thereby bring the second hold port 115b and third hold port 115c into mutual communication with each other.

The release valve 120 includes a freely slidable piston 122 within a cylinder 121, while the piston 122 divides or separates the first division chamber 120a in communication with the third hold port 115c on the hold diaphragm 115 side from a second division chamber 120b in communication with the output port 112 side. Within the cylinder 121, a flow passage 128 is formed that is in communication with the exhaust port 113 side. Further, the first division chamber 120a divided by the piston 122, as shown in FIG. 6, is connected in communication with a second decay port 116b formed in the decay valve which will be discussed later. The flow passage 128 is normally cut off from the second division chamber 120b side by the piston 122. The piston 122 is energized toward the right in FIG. 7 by a return spring 123. There are formed within the piston 122 a large number of flow passages 124. Also, a rubber sheet 125 is mounted on the piston for closing the flow passages 124. The rubber sheet 125 is structured such that, if the air pressure on the first division chamber 120a exceeds the air pressure on the second division chamber 120b by a given value (that is, if the air pressure reaches a level sufficient to deform the rubber sheet 125), the rubber sheet 125 is so deformed to thereby be able to supply the air pressure from the first division chamber 120a side to the second division chamber 120b side. On the other hand, if the air pressure on the second division chamber 120b exceeds the air pressure on the first division chamber 120a by a given value, then the rubber sheet 125 moves the piston 122 to the left in FIG. 7 against the energizing force of the return spring 123 to thereby be able to discharge the air pressure on the output port 112 side from the exhaust port 113 through the second division chamber 120b and flow passage 128.

In FIG. 7, reference character 126 designates a seal member which is provided on the end face of the piston 122, while 127 stands for a seal member which is interposed between the periphery of the piston 122 and the inner peripheral surface of the cylinder 121.

Figure 8:
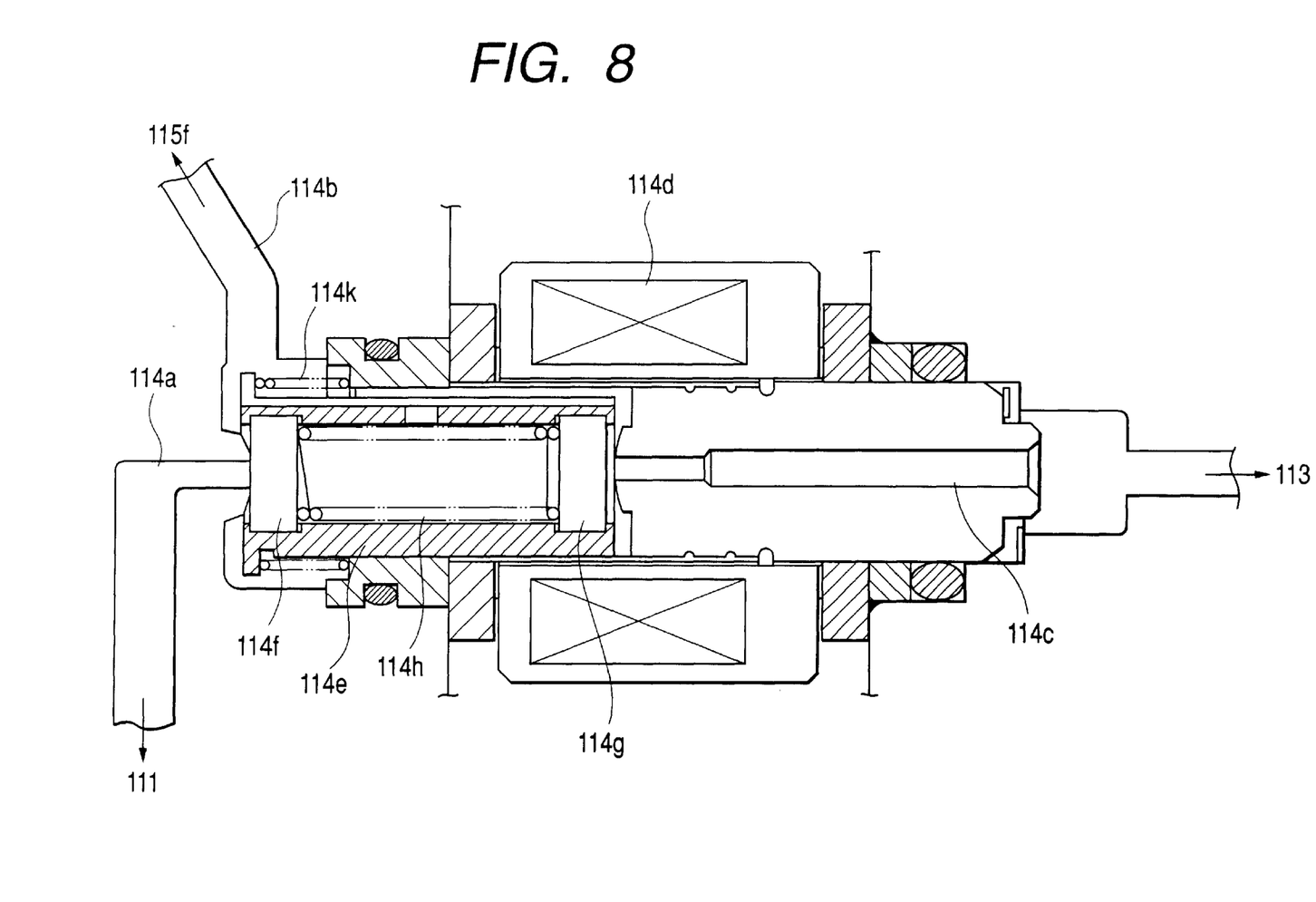
FIG. 8 is an enlarged sectional view of a hold valve disposed within the air control valve of FIG. 6.

FIG. 8 illustrates the hold valve 114, which includes a first valve port 114a, a second valve port 114b, and a third valve port 114c. Also, in the hold valve 114, there is disposed a plunger 114e which is used to bring these respective valve ports into communication with each other as well as cut off the communication between them. The plunger 114e includes two flow passage cutoff members 114f and 114g in the two end portions thereof and, between the two flow passage cutoff members 114f and 114g, there is interposed a spring 114h: that is, due to the energizing force of the spring 114h, the two flow passage cutoff members 114f and 114g are able to close the first and third valve ports 114a and 114c elastically. The plunger 114e is normally energized toward the left in FIG. 8 by a return spring 114k and, if a solenoid 114d is energized, then the plunger 114e can be moved to the right from the shown position.

The first valve port 114a of the hold valve 114 is in communication with the input port 111 side, the second valve port 114b thereof is in communication with the back pressure chamber 115f of the hold diaphragm 115, and the third valve port 114c thereof is in communication with the exhaust port 113; and, when not in operation, the first valve port 114a is cut off from the second valve port 114b, while the second valve port 114b is in communication with the third valve port 114c. If the solenoid 114d of the hold valve 114 is energized and the plunger 114e is thereby moved to the right in FIG. 8 to be turned into its operation condition, then the first valve port 114a is brought into communication the second valve port 114b, whereas the second valve port 114b is cut off from communication with the third valve port 114c.

As shown in FIG. 6, the decay valve 116 has a structure in which the third valve port 114c is omitted from the hold valve 114 passage, while the remaining portions of the decay valve 116 are the same as the hold valve 114. Therefore, as shown in FIG. 6, the first valve port 116a of the decay valve 116 corresponds to the fist valve port 114a of the hold valve 114, and the second valve port 116b of the decay valve 116 corresponds to the second valve port 114b of the hold valve 114.

The second valve port 116b of the decay valve 116 is in communication with the fist division chamber 120a of the release valve 120, while the first valve port 116a of the decay valve 116 is in communication with the exhaust port 113 on the main flow passage side; and, when not in operation, the first valve port 116a is cut off from the second valve port 116b. If the solenoid 116d of the decay valve 116 is energized and the plunger 116c is thereby moved to the right in FIG. 6 to be turned into its operation condition, then the first valve port 116a is brought into communication the second valve port 116b.

As shown in FIG. 5, the exhaust port 113 is connected in communication with the back pressure chamber 104b of the piston 104a of an air master cylinder 104 through a pipe 129, while the back pressure chamber 104b is normally held at the atmospheric pressure through the exhaust port 113. The air master cylinder 104 is similar in structure to the conventional air master cylinder: that is, if the air pressure coming from the output port 112 is applied to the piston 104a of the air master cylinder 104, then the piston 104a is moved to the right in FIG. 5 to thereby convert the air pressure into an oil pressure, so that the brake cylinder is actuated to thereby be able to apply the brakes. In FIG. 5, reference numeral 104c designates a return spring. However, the invention also contemplates that an alternative structure may be utilized in which instead of converting the air pressure into the oil pressure, the air pressure can also be supplied directly to the brake cylinder so that the brakes can be applied by the air pressure.

A description will now be given below of the operation of the brake pressure control device having the above-mentioned structure. If the brake pedal 102a is depressed, then the brake valve 102 is opened and thus, due to the operation of the relay valve 103, the air corresponding to the stepping-down force of the brake pedal 102a is supplied from the air tank 101 to the air control valve 110. The pressure of the air directed into the air control valve 110 through the input port 111 thereof acts on the hold diaphragm 115 (see FIG. 7) to move the diaphragm 115d to the left in FIG. 7 against the energizing force of the return spring 115e to thereby open the flow passage, so that the air pressure flows into the first division chamber 120a of the release valve 120. The air pressure directed into the first division chamber 120a deforms the rubber sheet 125 through the passages 124 formed in the piston 122 of the release valve 120 and, therefore, the air pressure flows from the first division chamber 120a side to the second division chamber 120b side and further flows out to the output port 112 side to thereby actuate the air master cylinder 104, with the result that, similarly to the conventional brake pressure control device, the brake cylinder 105 is actuated to thereby be able to apply the brakes.

When the brake pedal 102a is released, the air pressure within the first division chamber 120a of the release valve 120 moves the hold diaphragm 115 against the energizing force of the return spring 115e because the back pressure chamber 115f of the hold diaphragm 115 is held at the atmospheric pressure through the exhaust port 113. As a result, the air pressure in the first division chamber 120a is discharged to the open air through the input port 111. In response to this, due to the air pressure on the output port 112 side (that is, the second division chamber 120b side) acting on the piston 122, the piston 122 within the release valve 120 is moved to the left in FIG. 7 against the energizing force of the spring 123, so that the output port 112 is brought into communication with the exhaust port 113. As a result of this, the air pressure on the output port 112 side in communication with the air master cylinder 104 is discharged from the exhaust port 113 to the open air through the release valve 120, thereby releasing the brakes.

During this operation, part of the air pressure discharged to the exhaust port 113 side flows into the back pressure chamber 104b of the air master cylinder 104 through the pipe 129 which communicates the exhaust port 113 to the back pressure chamber 104b of the air master cylinder 104, and acts on the piston 104a of the air master cylinder 104 to thereby return the piston 104a to its initial position.

In this manner, according to the present embodiment, the number of the diaphragms used within the air control valve is reduced down to only one and, at the same time, the decay valve arranged within the air control valve is of a two-way and two-port type used to simplify the flow passage. As a result, the number of seal surfaces can be reduced, the working time can be shortened, and the modulator housing (that is, the main body of the air control valve) can be reduced in both size and weight.

During the brake releasing operation, if the piston 122 of the release valve 120 is fixed and thus cannot be moved, then the air pressure flows through orifices 129 and 130 into the first division chamber 120a and further pushes up the hold diaphragm 115, so that the air pressure can be released from the brake valve 102 through the input port 111.

During the brake applying operation, if the anti-lock control is initiated and a brake pressure hold instruction is issued, then the solenoid 114d of the hold valve 114 is energized to actuate the plunger 114e to thereby bring the first valve port 114a and second valve port 114b of the hold valve 114 into communication with each other, so that the air pressure from the air tank is applied onto the back pressure chamber 115f of the hold diaphragm 115 to thereby cut off the communication between the first valve port 114a and second valve port 114b of the hold valve 114 and, therefore, the air pressure on the air master cylinder side can be held at the current air pressure.

If a brake pressure reducing instruction is issued, then the solenoid 116d of the decay valve 116 is energized to actuate the plunger 116e to thereby bring the first valve port 116a and second valve port 116b of the decay valve 116 into communication with each other, so that the air pressure in the back pressure chamber 120a of the release valve 120 is released. As a result of this, the air pressure on the air master cylinder 104 side moves the piston 122 of the release valve 120 to the left in FIG. 7 and thus the air pressure is discharged from the flow passage 128 and exhaust port 113, thereby reducing the brake pressure.

If a brake pressure re-apply instruction is issued, then the hold valve 114 and decay valve 116 are both switched off and are returned to their respective initial positions and, therefore, the air pressure on the input port 111 side is applied to the hold diaphragm 115 to move the hold diaphragm 115 to the left in FIG. 7 against the energizing force of the return spring 115e to thereby open the flow passage, so that the air pressure flows into the first division chamber 120a of the release valve 120. The air pressure directed into the first division chamber 120a of the release valve 120 deforms the rubber sheet 125 through the flow passages 124 formed in the piston 122 of the release valve 120, so that the air pressure is supplied from the hold diaphragm 115 side to the output port 112 side, thereby being able to apply the brake pressure again.

As described above, according to the present embodiment, the number of the diaphragms used within the air control valve is reduced down to only one and, at the same time, the decay valve arranged within the air control valve is of a two-way and two-port type and is used to simplify the flow passage. This allows the number of seal surfaces to be reduced, the working time to be shortened, and the air control valve main body to be reduced in both size and weight.

In the above-mentioned embodiment, the release valve 120 is disposed within the air control valve 110. The invention also contemplates that the release valve can also be disposed at any functional position between the exhaust port 113 side passage and output port 112 side passage.

In summary, according to the first embodiment of the invention, between the exhaust port side of the air control valve and the air master cylinder side passage, there is disposed a release valve which, in the brake releasing operation, can release the air pressure on the air master cylinder to the exhaust port side and, at the same time, there is formed a flow passage which is used to bring the exhaust port side passage and the air master cylinder back pressure chamber side into communication with each other. This structure allows the air pressure on the output port side to be discharged immediately to the open air through a short passage including the release valve during the brake releasing operation. As a result, it is possible to enhance the pressure reducing performance of the brake pressure control device to a great extent. Moreover, the various air breather components, that are necessary in the conventional air master cylinder, do not need to be provided within the arrangement of the present invention. This results in the cost of the brake pressure control device being reduced and the assembling operation thereof can be simplified.

Also, according to the second embodiment of the invention, the number of diaphragms within the air control valve used in the brake pressure control device can be reduced down to only one, which makes it possible to reduce the number of parts used in the brake pressure control device arrangement. Moreover, the decay valve used in the air control valve is of a two-way and two-port type to thereby simplify the flow passage, so that the number of seal surfaces is reduced, the working time is shortened, and the structure of the valve main body is simplified, resulting in a reduced production cost of the brake pressure control device. Further, the whole of the air control valve arrangement is reduced in size and weight.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A brake pressure control device comprising:

a brake valve;

an air master cylinder for braking a wheel by an air pressure that is provided from said brake valve; and an air control valve, coupled between said brake valve and said air master cylinder, for selectively providing the air pressure from the brake valve into communication with said air master cylinder and selectively reducing a pressure level of the air pressure from the brake valve, said air control valve comprising:

an input port coupled to said brake valve for receiving the air pressure that is provided from said brake valve;

an exhaust port coupled to open air and to a back pressure chamber of the air master cylinder;

an output port coupled to the air master cylinder;

a pipe passageway coupled between the input port, exhaust port and output port, at least one diaphragm provided within said pipe passageway; and a release valve which is connected between the exhaust port and the output port for releasing air pressure from the output port to the exhaust port during a brake releasing operation, wherein said air control valve includes only one diaphragm within the pipe passageway.

2. An air control valve for use within a brake pressure control device to selectively provide air pressure to an air master cylinder and selectively reduce a pressure level of the air pressure, said air control valve comprising:

an input port for receiving the air pressure from an air supply;

an exhaust port coupled to open air and to the air master cylinder;

an output port coupled to the air master cylinder;

a pipe passageway coupled between the input port, the exhaust port and the output, at least one diaphragm provided within said pipe passageway; and a release valve which is connected between the exhaust port and the output port for releasing air pressure from the output port to the exhaust port during a brake releasing operation, wherein the air control valve includes only one diaphragm within the pipe passageway.

* * * * *